United States Patent
Mayfield

(10) Patent No.: US 6,968,431 B2
(45) Date of Patent: Nov. 22, 2005

(54) METHOD AND APPARATUS FOR LIVELOCK PREVENTION IN A MULTIPROCESSOR SYSTEM

(75) Inventor: Michael John Mayfield, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 790 days.

(21) Appl. No.: 09/998,397

(22) Filed: Nov. 15, 2001

(65) Prior Publication Data

US 2003/0093657 A1    May 15, 2003

(51) Int. Cl.[7] ..................... G06F 13/00; G06F 9/00; G06F 15/00
(52) U.S. Cl. .................. 711/146; 711/140; 711/141; 711/154
(58) Field of Search .................. 711/146, 147, 150, 711/151, 152, 100, 141; 710/36, 45, 200, 710/240, 244; 712/245

(56) References Cited

U.S. PATENT DOCUMENTS

| | | | | |
|---|---|---|---|---|
| 6,029,217 A | * | 2/2000 | Arimilli et al. | 710/107 |
| 6,078,981 A | * | 6/2000 | Hill et al. | 710/200 |
| 6,202,112 B1 | * | 3/2001 | Gadagkar et al. | 710/118 |
| 6,279,085 B1 | * | 8/2001 | Carpenter et al. | 711/143 |
| 6,286,068 B1 | * | 9/2001 | Arimilli et al. | 710/107 |
| 6,546,429 B1 | * | 4/2003 | Baumgartner et al. | 709/253 |

* cited by examiner

Primary Examiner—Tuan V. Thai
(74) Attorney, Agent, or Firm—Carr LLP; Diana R. Gerhardt

(57) ABSTRACT

In a multiprocessor system using snooping protocols, system command conflicts are prevented by comparing processor commands with prior snoops within a specified time defined window. A determination is then made as to whether a command issued by a given processor is likely to cause a system conflict with another command issued within said specified time defined window. If so, the time of execution of any such snoop command determined as being likely to cause a system conflict is delayed. This approach uses address bus arbitration rules to prevent system livelocks due to both coherency and resource conflicts.

17 Claims, 2 Drawing Sheets

METHOD AND APPARATUS FOR LIVELOCK PREVENTION IN A MULTIPROCESSOR SYSTEM

BACKGROUND OF THE INVENTION

The invention pertains generally to multiprocessor systems and more particularly to the prevention of livelock due to resource or coherency conflicts. With technology and design improvements of today, microprocessor operating frequencies may far exceed the frequency capabilities of multiprocessor system buses. One method of improving the system bus bandwidth and mitigating this frequency differential is to use wider buses. However, this solution results in a microprocessor cost adder for the additional pins required, and increases the cost of any memory controller attached to the system bus as well. Another way to improve system bus bandwidths is to use a narrow bus, but increase the bus speed by using point-to-point, unidirectional nets. When using these types of buses, a system bus switch is required to connect all of the microprocessor system buses. This system bus switch can be implemented as part of the memory controller.

If a system bus switch, including a memory controller, as described above is used to connect processors, it is possible to design the multiprocessor system to use snooping bus coherency protocols. In other words, the switch can be designed to accept commands from the processors, perform arbitration on these requests, and serially source these commands back to all processors as snoop commands, allowing each processor to see each command from every other processor. Each processor generates a snoop response to the snooped commands, sending these responses to the system bus switch. The snoop response generated by each processor is that processor's response to the snooped command, the response being a function of that processor's cache state for the requested coherency block, or a function of resource availability to perform the action requested, if any. The system bus switch logically combines the individual processor snoop responses, and sends the logical combination of all the processors snoop responses back to each processor. In such a system, the amount of time from the sourcing of the snoop command to the return of the combination of all the processor snoop responses can be several bus timing cycles. This number of bus cycles may be large and is usually longer than the desired snoop rate (the number of bus cycles between successive snoop commands). Two types of problems occur in systems where the time between the snoop command to that snoop commands' combined snoop response is larger than the time between successive snoop commands.

One problem is caused by coherency conflicts, where two or more processors in the multiprocessor system are attempting to perform conflicting operations on the same coherency block. A coherency block is defined herein as the smallest block of memory for which the processor will maintain cache coherency information. Usually, the coherency block size is the cache line size for the processor. An example of such a conflict would be a situation where two processors are attempting to do stores to the same coherency block. These stores would typically or most reasonably be to different byte locations in the coherency block. The stores must be logically serialized so that both stores are correctly reflected in the final coherency block result. In a snooping system allowing pipelined operations, the chronological bus sequence for each store is (1) the store command is snooped, (2) each processor sources its snoop response on the snoop response out bus, and (3) the combined snoop response is sourced to each processor (on the snoop response in bus). Complexity occurs when the bus sequences for the two stores from different processors (such as A and B shown in FIG. 2 to be later described) overlap such that A's combined snoop response in occurs after B's snoop response out. In this case, other system processors would be forced to respond to the B snoop command before seeing the combined response for the A snoop. Since the response to snoop command B could be dependent on the combined response for snoop command A, this sequence must be avoided.

Another problem occurs with snoop commands overlapped as described above. In the case where processors limit snoop command rates due to their resources or pacing requirements, a similar problem exists with overlapping snoop commands. In the case where there is a sequence of these command types on the bus, and the snoop commands are overlapped, a system livelock can occur. As defined herein, system livelock is a repetitive sequence of snoop command retries. This can happen if different snooping processors are forced to retry different commands, with the result that all commands are retried by some processor. Some mechanism to break this livelock must be present, if such a livelock can occur.

One approach that attempts to avoid these problems is the use of a non-pipelined bus, at least non-pipelined as far as the snoop command to combined snoop response in time is concerned. However, this restriction limits the system bus snoop rate, usually resulting in a performance problem (degradation) in multiprocessor systems.

For pipelined busses, one prior art method of solving the above mentioned problem is to use additional bus signals to support an additional retry protocol. This retry protocol can be used to retry snoop commands to the same addresses, which are within the snoop response out to snoop response in time window. While this approach is feasible on a single multiprocessor bus, the technique is more complicated in a multiple bus system such as shown in FIG. 1 to be later described. In addition, this prior art method requires that the address arbiter (if one exists) monitor the bus retries to detect the case where the bus gets into a sequence of repetitive retries due to conflicts with the prior bus commands. Some method must be implemented to break such a repetitive sequence when detected. One such way is for the arbiter, upon detection of such a sequence, to temporarily slow the snoop rate to remove the snoop command overlaps and break the repetitive retry sequence.

Since these solutions either reduce the system snoop rate or add complexity to the processors and system bus arbiter, what is needed is a simpler way to maximize the system snoop rate while solving these conflict problems caused by a pipelined snoop bus.

SUMMARY

The present invention, accordingly, provides a method and apparatus implemented within the system bus switch to avoid the two problems presented above. An intelligent system bus switch arbitrates among queued processor commands to determine the sequence of sourcing these commands to the processors for snooping. By adding arbitration rules to avoid the problem cases as described above, no logic circuitry is required to handle the referenced problem cases. An additional benefit to the present approach is that the retry activity on the system bus is reduced thereby improving performance.

This invention thus provides apparatus for and a method of preventing system command conflicts in a multiprocessor system by comparing processor commands with prior snoop commands within a specified time defined window, determining whether a command issued by a given processor is likely to cause a system conflict with another snoop command issued within said specified time defined window, and then delaying the time of execution of any such command determined as being likely to cause a system conflict.

The foregoing and other objects, features and advantages of the invention will be apparent from the following more particular description of a preferred embodiment of the invention, as illustrated in the accompanying drawing wherein like reference numbers represent like parts of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
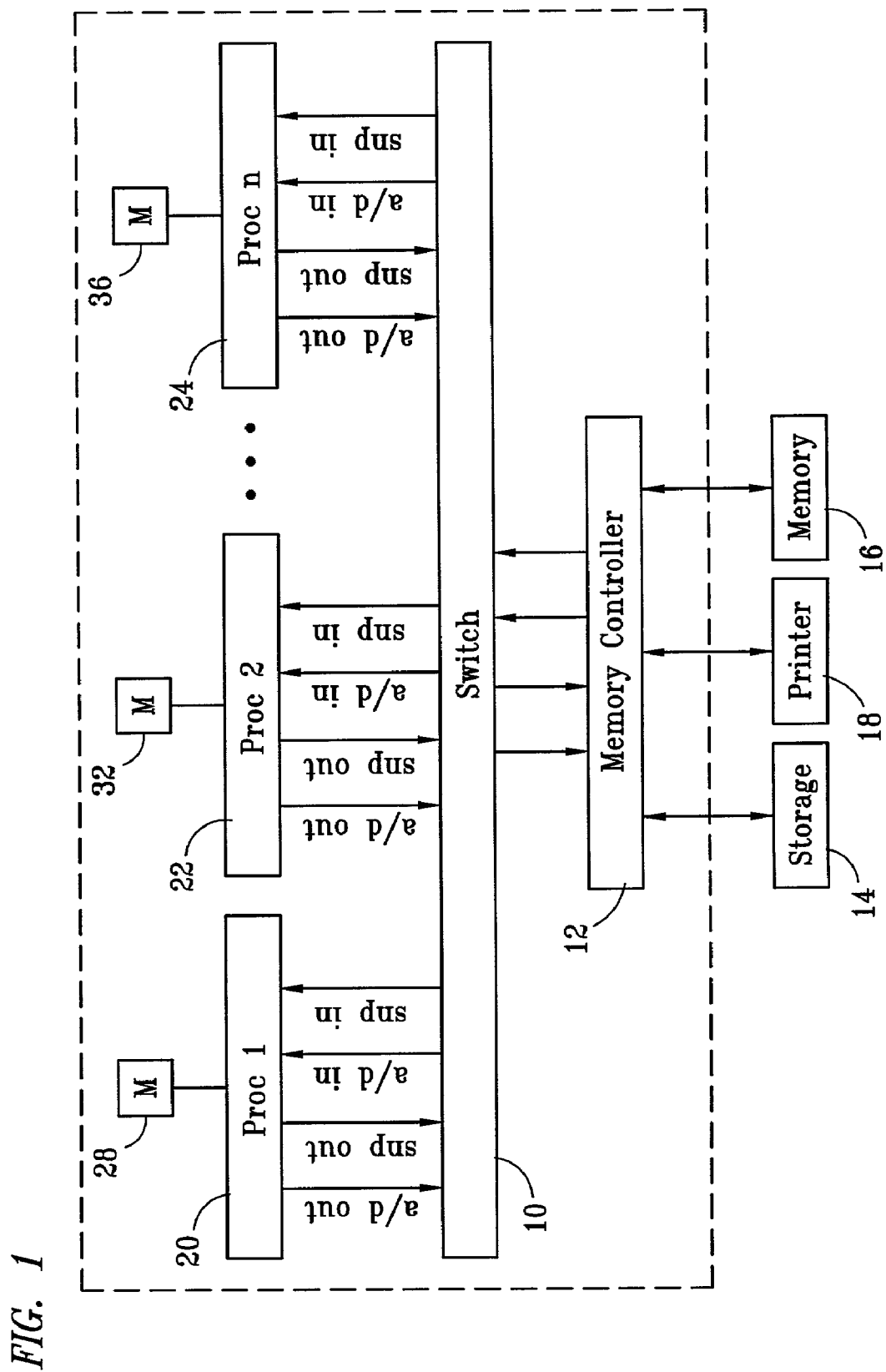
FIG. 1 is a timing diagram showing overlapped snoop commands and snoop responses.

In FIG. 1, a switch 10 is shown interconnected to a memory controller 12 to provide an intelligent switch. The memory controller 12 is further interconnected to peripheral devices such as one or more permanent storage devices 14, memory 16 and printing means 18. An alternative configuration might have some of the peripheral devices connected directly to the switch 10. Switch 10 is also connected to a plurality of processors 1, 2 and n designated respectively as 20, 22 and 24; each processor may contain several levels of caches (not shown). Processor 20 is further shown connected to an optional memory 28. In a similar manner, processor 22 is connected to optional memory 32 while processor 24 is connected to optional memory 36. As will be realized by those skilled in the art, the memories directly attached to the processors are not required for this invention. The optional memories are merely illustrated for completeness of disclosure. Each of the processors 20, 22 and 24 are shown having "a/d out" leads, or buses, for supplying commands and data to the switch 10 as well as having "a/d in," or buses leads, for receiving commands and data from the switch 10. Similarly, each of the processors 20–24 are shown having "snp out" leads or unidirectional buses for supplying or sourcing snoop response signals to the switch 10 and further having "snp in" leads for receiving combined snoop response signals from switch 10.

Figure 2:
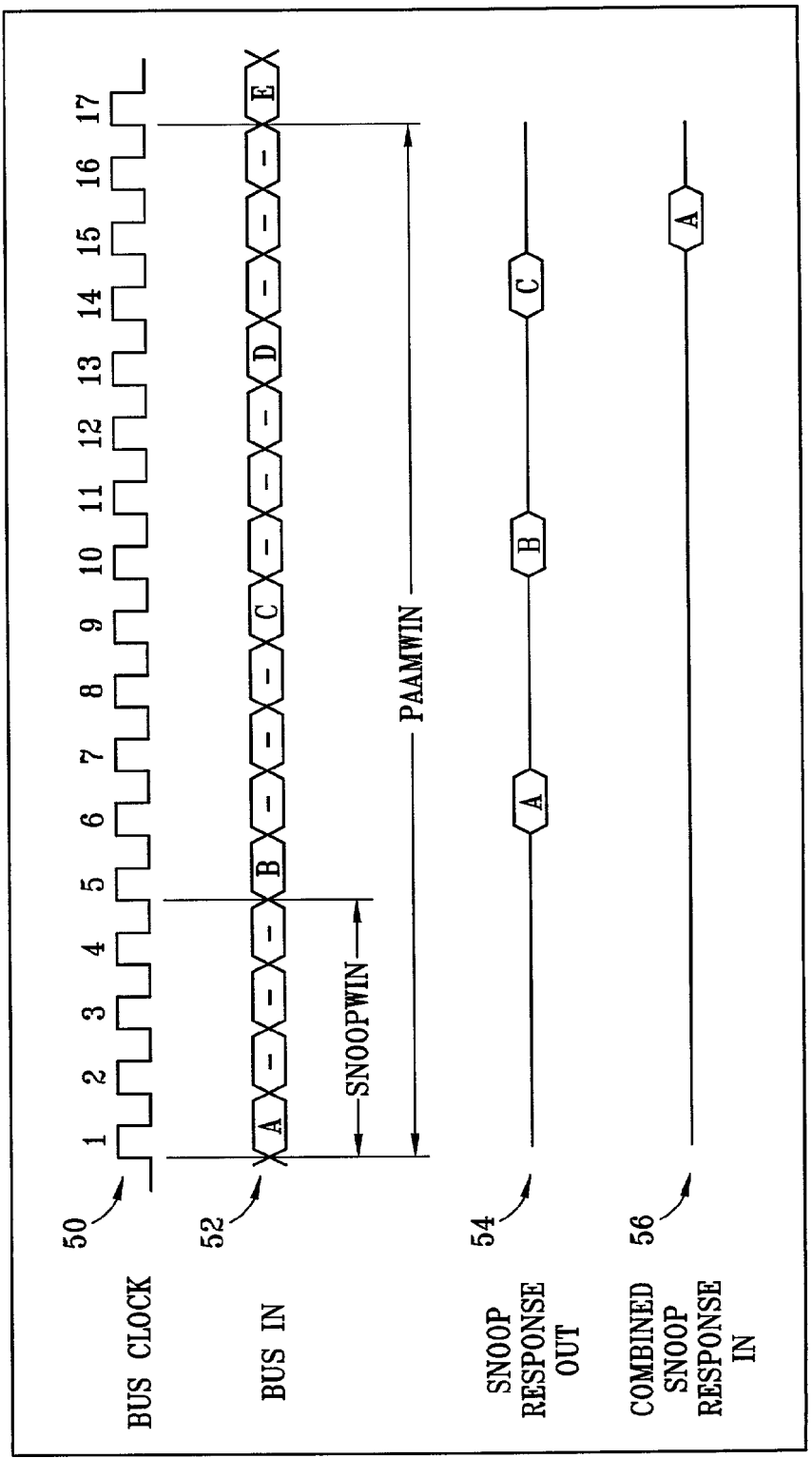
FIG. 2 is a block diagram of multiprocessor system with a system bus switch.

In FIG. 2, a series of numbers from 1–17 are intended to be indicative of 17 consecutive clock cycles of a bus clock waveform generally labeled 50. The waveform for the processor a/d out bus is not shown in this figure. However, in this example, the system bus switch receives processor commands A through E via the individual processor a/d out buses. These commands are returned to the processors as snoop commands, as shown in the bus in waveform, labeled 52; this waveform is indicative of address/data signals from the switch 10 sourced to the processors connected thereto (using the processor a/d in buses). A label "SNOOPWIN" is intended to show that for this implementation of the invention, a snoop command never occurs more often than once every four bus clock cycles. A further label "PAAMWIN" is intended to illustrate a window of time, shown here as 16 bus clock cycles, within which certain arbitrary rules are followed by the switch 10 with regard to snoop commands being sourced to the processors, as will be discussed in connection with operation of the invention. A waveform 54 labeled "Snoop Response Out" illustrates a possible timing for the processor response to the snoop commands; these responses, sent by the processors 20 through 24 to the switch 10, are for the snoop commands A, B, and C, shown on the processors a/d bus in 52. While each snoop response output is shown delayed by five bus cycles relative the time it was received by the switch 10, the delay may be more or less in accordance with design. A final waveform 56 labeled "Combined Snoop Response In" illustrates a possible timing output from the switch 10 to the snp in bus of processors 20 through 24 of the logical combination of all responses reflected from the processors 20 through 24 as a result of snoop input A.

In a multiprocessor system with point-to-point high speed, unidirectional buses, such as shown in FIG. 1, a system bus switch 10 must be used to connect the processors. As shown, this switch function may be included as part of the systems memory controller 12. The processors 20 through 24 source or send commands to the address switch 10 on their outbound bus (a/d out). There is no outbound bus arbitration required in this system. Processors can source outbound commands at any time. If the system bus switch is not able to process the command, there is a sideband retry signal (not specifically shown but which process is known in the prior art) used to force the processor to resend the command. Once accepted by the system bus switch, the commands from each processor 20 through 24 enter an arbitration stage, comprising a part of memory controller 12, which selects a sequence in which these commands will be sent for snooping. In a serial fashion, each command is reflected back to all processors, at the same time, for snooping via the processor inbound buses (the aid in buses). Separate unidirectional snoop response buses carry the snoop response out from the processors 20 through 24 and subsequently the combined Snoop Response In sent from the switch 12 on the snoop response in bus of these same processors. Since the system bus switch 12 determines the order and spacing of these reflected commands (snoops), then a simple logic operation in the address controller 12 can be used to solve the two prior art problems listed above.

In the referenced simple logic operation, the system bus switch first performs address comparisons on the processor commands waiting to be selected for snooping and the prior snoop commands that have been sent on the processor inbound buses. If any pending snoop command matches prior snoop commands in the PAAMWIN window, then this snoop command is not allowed to arbitrate for the next snoop slot. For example, in FIG. 2, several snoop commands, A, B, C, D, and E are shown on the processor inbound a/d bus timing diagram 52. It may be observed that snoop commands B, C, and D are overlapped with snoop command A. "Overlapped," as defined herein, means that the processor snoop responses for snoop commands B, C and D must be sourced before the Snoop Response In for snoop command A is available at the processors. In accordance with the logic used in this method, snoop commands B, C and D are not allowed to be to the same coherency block as snoop command A.

The second referenced prior art problem can be avoided with a similar mechanism if the processors indicate via a bit in the command field which commands result in resource or pacing conflicts. The system bus switch may then use the inserted bit indications to insure that these command types are also not overlapped. For example, in FIG. 2, snoop command A has been denoted by a sourcing processor as one which causes resource or pacing conflicts, then none of the snoop commands B, C, or D can also be a snoop command of this class. Since the system bus switch 10 can enforce this non-overlap, the need for recovery logic in the event of continuous retries due to such overlaps is avoided.

Several implementation methods can be used to accomplish these arbitration goals. As an example, in FIG. 2, the minimum time between snoop commands (SNOOPWIN) is shown as four bus clocks. Snoop A, occurring in bus cycle 1 has its snoop response out valid in bus cycle 6 and its combined snoop response valid in bus cycle 15. Additional time may be required by the processors to use the combined response of snoop A in a subsequent snoop response out. A system parameter, PAAMWIN, can be dynamically set to allow for this additional delay, shown in FIG. 2 as 16 bus cycles. For this example, snoops A and E are independent, but the snoop E is dependent on snoops B, C, and D, as these snoops are within PAAMWIN.

Simple logic in controller 12 can be used to determine if snoop command E must be delayed. First, if snoop command E is to the same line (coherency block) as snoop commands B, C or D, it must be blocked. This is done simply by maintaining a snoop history in the controller 12 of the last three valid snoop times and comparing the addresses of these snoop commands to snoop E. (Bus cycles 5, 9, and 13 are shown as valid snoop times (time slots during which snoops are allowed to occur), based on SNOOPWIN, but there may not have been a valid snoop command at those times.) The number of snoop slots, which must be maintained is determined by the implementation. The second case for delaying snoop E occurs if the pipeline bit in snoop E's command field is not set. In this case, snoop command E must be delayed if any of the last three snoop slots (B, C or D) contained a valid snoop command, which also has the pipeline bit not set.

These simple rules are all that is required to avoid the coherency and livelock problems previously described. By allowing bus pipelining in all non-conflict cases, the system bus snoop rate is kept as high as possible, thereby improving performance. By avoiding the conflict cases or situations, the complexity of the system bus is reduced and the system performance is improved by minimizing the retries that such conflicts would require. As bus frequencies increase to provide more bandwidth to the processors, the ability to pipeline addresses and avoid conflict retries, is a distinctly advantageous key to improving multiprocessor system performance.

Although the invention has been described with reference to a specific embodiment, this description is not meant to be construed in a limiting sense. Various modifications of the disclosed embodiment, as well as alternative embodiments of the invention, will become apparent to persons skilled in the art upon reference to the description of the invention. It is therefore contemplated that the claims will cover any such modifications or embodiments that fall within the true scope and spirit of the invention.

What is claimed is:

1. A method of preventing system resource and command conflicts in a multiprocessor system, comprising the steps of:
    issuing, by a given processor, a processor command, wherein the processor command is waiting to be selected for snooping;
    comparing an address of the processor command to addresses of all prior snoop commands occurring within a predetermined time window;
    determining if the processor command and the prior snoop commands are non-pipelined; and
    in response to the address of the processor command matching one or more of the addresses of the prior snoop commands occurring within the predetermined time window, or in response to determining that the processor command is non-pipelined and one or more of the prior snoop commands occurring within the predetermined time window are non-pipelined, delaying sourcing of the processor command until the end of a second predetermined time window.

2. The method of claim 1 wherein the comparing and detecting includes applying a given set of arbitration rules to ascertain potential resource and command conflicts.

3. The method of claim 1 wherein the comparing, determining, and sourcing occurs separately from any of the processors of the multiprocessor system.

4. The method of claim 3 wherein the comparing, determining, and sourcing occurs in an intelligent switch controller.

5. The method of claim 1 wherein in response to the address of the processor command not matching the addresses of the prior snoop commands occurring within the predetermined time window, and in response to determining that the processor command is either pipelined, or non-pipelined and none of the prior snoop commands occurring within the predetermined time window are non-pipelined, sourcing the processor command without substantial delay.

6. The method of claim 1 wherein the predetermined time window and the second predetermined time window are identical.

7. A method of preventing system command conflicts in a multiprocessor system, comprising the steps of:
    determining whether a command issued by a given processor is denoted to be a non-pipelined command;
    detecting whether any prior commands issued within a specified time defined window are non-pipelined commands; and
    delaying the sourcing of a snoop of any such non-pipelined command if there is any other comparable non-pipelined command in the specified window.

8. The method of claim 7 wherein the determining and detecting and snoop sourcing occurs separately from any of the processors of the multiprocessor system.

9. The method of claim 8 wherein the comparing and snoop sourcing occurs in an intelligent switch controller.

10. A method of preventing system resource and command conflicts in a multiprocessor system, comprising the steps of:
    comparing processor commands to prior snoops within a predetermined time defined window;
    detecting whether the addresses of these commands match coherency blocks of said prior snoops;
    determining whether a command issued by a given processor is denoted to be a non-pipelined command;
    detecting whether any prior commands issued within a specified time defined window are non-pipelined commands where said specified and predetermined time defined window may be identical;
    delaying the sourcing of the snoop commands which do match until after the end of the predetermined time defined window; and delaying the sourcing of the snoop of any such non-pipelined command if there is any other comparable non-pipelined command in the specified time defined window.

11. Apparatus for preventing system resource and command conflicts in a multiprocessor system, comprising:
- a plurality of processors;
- an intelligent switch connected to each of said plurality of processors for routing commands received from said processors;
- means for comparing processor commands to prior snoops;
- means for determining whether a command issued by a given processor is denoted to be a non-pipelined command;
- means for detecting within a predetermined time window whether the addresses of these commands match said prior snoops coherency blocks and if any prior commands issued are non-pipelined commands; and
- means for delaying the sourcing of the snoop of commands which do match and the non-pipelined commands if there is any comparable non-pipelined command until the end of a specified window.

12. The apparatus of claim 11 wherein a given set of arbitration rules is used by said intelligent switch to ascertain potential resource and command conflicts.

13. The apparatus of claim 11 wherein the comparing, determining and sourcing occurs separately from any of the processors of the multiprocessor system.

14. Apparatus for preventing system command conflicts in a multiprocessor system, comprising:
- a plurality of processors;
- an intelligent switch connected to each of said plurality of processors for routing commands received from said processors;
- means for determining whether a command issued by a given processor is denoted to be a non-pipelined command;
- means for detecting whether any prior commands issued within a specified time defined window are non-pipelined commands; and
- means for delaying the sourcing of a snoop of any such non-pipelined command if there is any other comparable non-pipelined command in the specified window.

15. The apparatus of claim 14 wherein said determining and snoop sourcing occurs separately from any of the processors of the multiprocessor system.

16. The apparatus of claim 14 wherein said intelligent switch performs said determining and snoop sourcing.

17. Apparatus for preventing system resource and command conflicts in a multiprocessor system, comprising:
- means for comparing processor commands to prior snoops within a predetermined time defined window;
- means for detecting whether the addresses of these commands match coherency blocks of said prior snoops;
- means for determining whether a command issued by a given processor is denoted to be a non-pipelined command;
- means for detecting whether any prior commands issued within a specified time defined window are non-pipelined commands where said specified and predetermined time defined window may be identical;
- means for delaying the sourcing of the snoop commands which do match until after the end of the predetermined time defined window; and
- means for delaying the sourcing of the snoop of any such non-pipelined command if there is any other comparable non-pipelined command in the specified time defined window.

* * * * *